// United States Patent [15] 3,697,983
Potter [45] Oct. 10, 1972

[54] ALERTING DEVICES, OSCILLATORS AND FLIP FLOPS

[72] Inventor: Bronson M. Potter, Greenville, N.H.
[73] Assignee: P. R. Mallory & Co., Inc., Indianapolis, Ind.

[22] Filed: Aug. 20, 1971
[21] Appl. No.: 173,640

Related U.S. Application Data

[63] Continuation of Ser. No. 809,539, March 24, 1969, abandoned.

[52] U.S. Cl. ....................340/384 E, 331/116
[51] Int. Cl. ....................G08b 3/00
[58] Field of Search ....................340/384 E; 331/116

[56] References Cited

UNITED STATES PATENTS 3,440,648 4/1969 Camenzind ............340/384 E

*Primary Examiner*—Richard Murray
*Attorney*—Richard H. Childress, Henry W. Cummings and Robert F. Meyer

[57] ABSTRACT

Sonic alerting devices of the type controlled by natural frequency of the transducer have efficient drives and can omit capacitors by employing two transistors connected in series configuration with transducer operation in the series resonant mode. In asymmetrical Circuits a first transistor in its energized state controls a second transistor through a potential drop device, the second transistor may conduct slightly in its de-energized state and serve as a circuit impedance for the first, and the second transistor is connected back to the first through the transducer by which the first transistor is de-energized and the second transistor changes to its energized state. A general class of multivibrators using the asymmetrical circuit is also represented by bistable flip flops and free running multivibrators. Transistors of all the same NPN or PNP syntax and omission of resistors in the power stage enable compact integrated circuits to be formed on single semiconductor chips.

11 Claims, 6 Drawing Figures

ALERTING DEVICES, OSCILLATORS AND FLIP FLOPS

This application is a continuation of application, Ser. No. 809,539, filed Mar. 24, 1969, and now abandoned.

An object of the invention is to provide improved, and in particular inexpensive, solid state sonic alerting devices and oscillators, multivibrators and bistable flip flops.

Another object is to provide such circuits which are highly efficient, have extremely small power requirements and are capable of being instrumented in extremely compact form and as integrated circuits on single chips.

Another object is to provide sonic alerting devices which are suitable for audible warnings for automobile instrument panels, computers, telephones, portable equipment, and the like.

Another object is to provide multivibrators suitable as oscillators, free running multivibrators and flip flops in a way permitting more logic functions to be performed on a single semi-conductor chip.

According to one aspect of the invention it is realized that a driving stage for a sonic alerting device, of the type controlled by the natural frequency of the transducer can be provided by a two of transistors connected in series configuration, with the transducer operating in the series resonant mode to control the energized states of the transistor circuit.

The invention features transducer driving stages in which: the transistors have no collector resistors; one of the transistors is connected for common collector operation and the emitter of this transistor drives the transducer; all of the transistors are of the same syntax (either all NPN or all PNP); close spacing of the transistors on integrated circuitry; and formation according to inexpensive same-syntax techniques.

The invention also features such circuits with an asymmetrical configuration in which a first transistor in its energized state controls the second transistor through a potential drop device, advantageously in the form of a diode which exhibits minimal power loss. In this configuration the second transistor may be biased so that it conducts slightly even in its de-energized state and serves as part of the circuit impedance for the first transistor. The second transistor is connected back through an impedance to the first, thus to establish two operating states.

The invention features a first transistor connected to operate in the common base mode, a second transistor connected to operate in the common collector mode and biasing of the second transistor achieved by connection of the collector of the first to the base of the second, and connection of the collector of the first through a potential drop means, preferably a diode, to the emitter of the second. With transistors of all of the same syntax and no capacitors, this circuit is ideally suited for manufacture as an integrated circuit on a single semi-conductor chip.

According to still another aspect of the invention it is realized that by substituting a resistor for the transducer just mentioned, an exceedingly simple flip flop can be realized, while by substituting a capacitor, an exceedingly simple free running multivibrator or an emitter of forms of energy other than audible sound can be easily realized.

Other objects, features, and advantages will appear from the following description of a preferred embodiment of the invention, taken together with the attached drawings thereof, in which.

Figure 1:
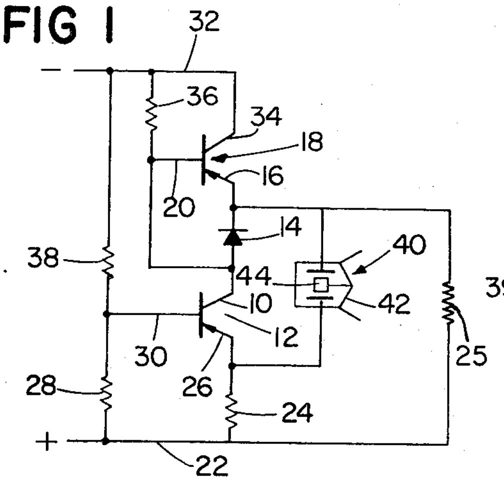
FIG. 1 is a schematic wiring diagram of a preferred embodiment of the invention connected to a piezoelectric transducer alerting device, employing the asymmetrical circuit.

Referring to FIG. 1 collector 10 on PNP transistor 12 is connected in series through diode 14 to emitter 16 on PNP transistor 18 and is directly connected to base 20 on transistor 18. Positive bus 22 is connected through resistor 24 to emitter 26 of transistor 12 and through resistor 28 to base 30 of transistor 12. Negative bus 32 is connected directly to collector 34 of transistor 18, through resistor 36 to base 20 of transistor 18, and through resistor 38 to base 30. Typically, a d.c. voltage of 12 volts is applied between buses 22 and 32 (although voltages between 2 and 50 volts may be used). Diode 14 is arranged to exhibit a potential drop 9 approximately 0.2 volts) when current passes therethrough from collector 10 to emitter 16 and to partially reverse bias the base-to-emitter junction of transistor 18 in the manner that only a nominal current flows from emitter 16 to collector 34 —the "de-energized" state of operation for transistor 18 in the circuitry used for this embodiment. Resistors 28 and 38 are arranged to cooperate in a manner to maintain base 30 at a constant or nearly constant potential when transistor 12 is conducting.

Piezoelectric transducer 40 has piezoelectric crystal 42 glued on diagram 44 (other types of piezoelectric transducers may be used as well), and is connected between emitter 16 and emitter 26. For purposes of the oscillation in the circuit, transducer 40 may be viewed as an element that, at a certain frequency, opposes the flow of current less than at any other frequency so that oscillation is maintained at this critical frequency —at which transducer 40 is said to be in its series resonant mode.

Figure 1A:
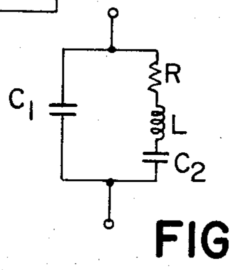
FIG. 1A is the electrical equivalent of the transducer of FIG. 1.
Figure 1B:
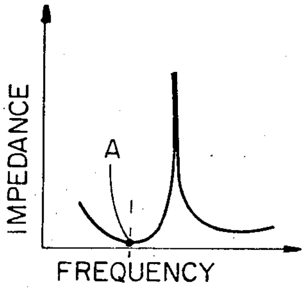
FIG. 1B is a graph of impedance versus frequency for the transducer of FIG. 1.

As is known, the impedance which a transducer presents to an oscillating circuit is a function of the frequency at which the circuit oscillates. From an electrical viewpoint a transducer may be represented, as shown in FIG. 1A, by a capacitor $C_1$ connected in parallel with the series combination of R, L and $C_2$. Transducers having a high q, i.e., the ratio of energy stored to energy emitted--are desirable for use with low power circuits for alerting devices. As is shown in FIG. 1B such transducers exhibit sharp changes in impedance with changes in frequency. Maximum audible output is obtained when operation is at the frequency at which the impedance is at a minimum. When the transducer is in its series resonant mode the reactive effects of L and $C_2$ cancel each other out and operation is at point A in FIG. 1B.

With properly chosen transistors, transducer and the other components the circuit is unstable. Thermal activity or noise activates the circuit and in a manner well known in the art energizes one transistor or the other. Assume that at a given point in time transistor 18 by reason of thermal activity tends to conduct more than previously to that point in time. Emitter 16 approaches the potential of bus 32 and the current through crystal 42 and into resistor 24 so as to tend to bias transistor 12 off. This reduces current through diode 14 so as to further energize transistor 18. This regeneration occurs in a manner well known to those skilled in the art until transistor 18 is biased to a point where it is no longer able to maintain transistor 12 in its de-energized state by means of current through the transducer. The process then reverses, transistor 12 tending into its energized state and increasing current through diode 14 so as to reverse bias the base-emitter junction of transistor 18, thereby reducing its energization.

Transistor circuit values are readily designed so that there is gain sufficient to maintain oscillation only at the series resonant frequency of the transducer, thereby causing the maximum amount of audible power to be radiated at a given supply voltage. See Hunter, *Handbook of Semiconductor Electronics*, McGraw Hill, 1962.

For free oscillation as just described it is important that resistor 36 be sized sufficiently large in view of the other components of the circuit to prevent transistor 18 from saturating when it is on, i.e., so that the loop gain is greater than unity and oscillation is maintained.

It will be observed that transistor 12 operates in the common base mode and transistor 18 operates in the common collector mode.

Use of the following circuit elements will readily demonstrate operability of the circuit:

| | |
|---|---|
| Resistor 38: 51 K ohms | |
| Resistor 28: 510 ohms | |
| Resistor 36: 20 K ohms | |
| Resistor 24: 91 ohms | |
| PNP transistors: Type 2N123 | |
| Diode 14: germanium | |
| Transducer 40: | 2800 cycles nominal (for example, those sold in alerting devices under the trademark "Sonalert" by Honeywell, Inc.). |

Figure 4:
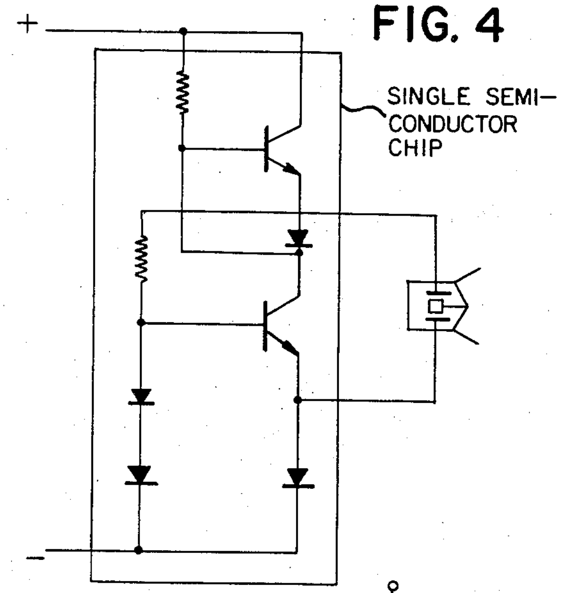
FIG. 4 is a schematic wiring diagram of an alerting device similar to FIG. 1 in which diodes are substituted for many of the resistors.

FIG. 4 shows a similar circuit with diodes replacing certain resistors and using NPN transistors. In either embodiment the entire electrical circuit shown may be electro-deposited on crystal 42 with external leads soldered thereto and connected to a standard 6 or 12 volt battery for a power supply.

Similar circuits may be constructed for an extremely small RF emitter in integrated circuit form by employing a piezocrystal as the reactive element and adding an external lead with an inductance for an antenna. When powered by a standard 6 volt battery it may be maintenance free for as long as a year, making it suitable for instance for implantation in animals.

Figure 2:
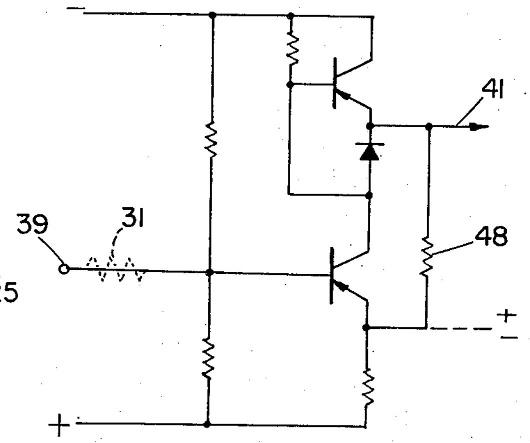
FIG. 2 is a schematic wiring diagram of a preferred embodiment of a bistable flip flop responsive to pulse inputs.

FIG. 2 shows a bistable flip flop with circuitry similar to FIG. 1, except that emitters 16 and 26 are connected through resistor 48 instead of transducer 40, and input and output terminals 39 and 41 are provided. In this embodiment one transistor is energized and the other is de-energized until a pulse applied to terminal 39 (the pulse may be applied elsewhere, e.g., at the emitter 26 of transistor 12 as indicated by dotted lines) reverses the respective states of energization. For example, if transistor 12 is conducting transistor 18 is biased to its de-energized state by the potential drop across diode 14. When a positive pulse is applied from input terminal 39 to base 30 (or a negative pulse applied to emitter 26) transistor 12 is de-energized and transistor 18 is turned on and conducts. When an input of the opposite polarity is next applied to terminal 39, transistor 12 is biased on, biasing off transistor 18.

Since transistor 18 conducts in the common collector mode, the output at emitter 16 has a low impedance. Thus, the resistance of resistor 48 may be very small. For example, resistor 48 may be a light bulb and, therefore, could readily be used with an integrated circuit.

This circuit may be modified to monitor voltages, rather than responding only to pulse inputs, by adding a suitable resistor 31 as shown in dotted lines, for example, between base 30 and input terminal 39. This will make base 30, which is current sensitive when connected as shown in solid lines in FIG. 2, voltage responsive in the manner that switching from operation of transistor 12 to operation of transistor 18 occurs only when the input voltage exceeds a predetermined value and that return to operation of transistor 12 occurs when the voltage drops below a chosen value.

Figure 3:
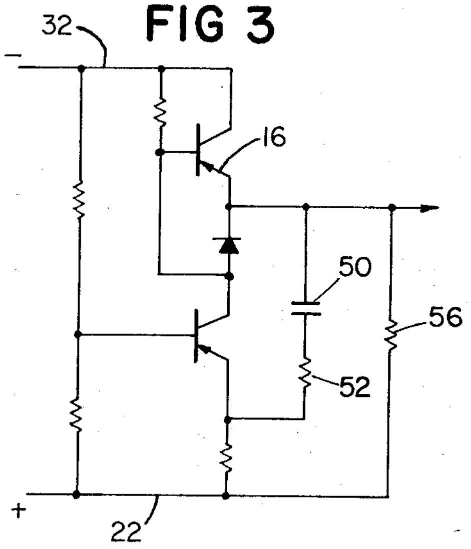
FIG. 3 is a schematic wiring diagram of a preferred embodiment of a free-running multivibrator.

FIG. 3 shows a free-running multivibrator in which emitters 16 and 26 are connected through capacitor 50 and resistor 52 and load resistor 56 is connected between emitter 22 and bus 32. Operation is similar to that for the circuit of FIG. 1. When transistor 18 is on, capacitor 50 is charging, and transistor 12 is held off. As capacitor 50 approaches full charge, transistor 12 turns on and the potential drop across diode 14 returns transistor 18 to its de-energized state. Current flowing through transistor 12 an diode 14 holds transistor 18 off until capacitor 50 is discharged, whereupon transistor 18 conducts and transistor 12 is turned off by current through capacitor 50. The frequency of oscillation in this embodiment is determined by the charging time of capacitor 50.

In the circuits described above, resistor 38 may be connected between base 30 and emitter 16 (instead of bus 32) with a resulting reduction of the gain of transistor 12, but with improved efficiency. Although at first glance not obvious, the transistor 12 can still be considered as operating in the common base mode.

In all of the circuits so far described, transistor 18 in its de-energized state may act as the collector impedance for transistor 12, and, in any event, there are no resistors in the power output circuit. The fact that these circuits do not dissipate power in collector resistors, and thus avoid resultant heating, permits the integrating of multiple circuits on a single chip and certainly more than is possible with existing circuitry.

FIG. 4 is similar to FIG. 1 but shows all transistors of NPN syntax. Since all transistors are of the same syntax, they may be manufactured inexpensively in integrated circuit form.

What is claimed is:

1. In an electronic circuit having transistors and capable, when connected to a power supply, of operating a load at least momentarily in either of two different states, the improvement wherein there is a first transistor connected to a second transistor through potential drop means, and said second transistor connected back to said first transistor through an impedance, said first transistor connected for common base operation in its energized state and said second transistor connected for common collector operation in its energized state, one side of said load connected between said second transistor, and said potential drop means, another side of said load connected between said impedance and said first transistor.

2. The electronic circuit of claim 1 wherein said potential drop means comprises a diode.

3. The electronic circuit of claim 1 including a pair of conductors across which a D.C. voltage may be applied, the emitter of said first transistor connected through a suitable impedance to the first of said conductors, the collector of said first transistor connected to the base of said second transistor and connected through said potential drop means to the emitter of said second transistor, the collector of said second transistor connected directly to the second of said conductors, and the base of said first transistor connected to a point of substantially constant potential of a value lying between the values of potential applied to said conductors.

4. The electronic circuit of claim 3 wherein the base of said second transistor is connected through a resistance to the second of said conductors sized to bias said second transistor to its energized state in the absence of energization of said first transistor.

5. The electronic circuit of claim 3 including means defining the point of substantially constant potential in the form of a voltage determining network extending between said two conductors.

6. The electronic circuit of claim 1 wherein said load is a reactive element.

7. The electronic circuit of claim 6 wherein said reactive element is a radio frequency crystal.

8. The electronic circuit of claim 6 wherein the reactance of said element is defined at least in part by a transducer storing mechanical energy.

9. The electronic circuit of claim 8 wherein said reactive element is a sonic transducer.

10. The circuit of claim 9 in which said transducer is a piezoelectric element.

11. The electronic circuit of claim 9 wherein the natural frequency of oscillation of said sonic transducer is within the frequency range of sensitivity of the human ear.

* * * * *